United States Patent [19]
Jacobs

[11] Patent Number: 5,481,655
[45] Date of Patent: Jan. 2, 1996

US005481655A

[54] SYSTEM FOR MATCHING A PICTURE ON A MONITOR TO A PRINTED PICTURE

[75] Inventor: Michael Jacobs, Groton, Mass.

[73] Assignee: Iris Graphics, Inc., Bedford, Mass.

[21] Appl. No.: 947,256

[22] Filed: Sep. 18, 1992

[51] Int. Cl.$^6$ .................................................. H04N 1/46
[52] U.S. Cl. ........................ 395/109; 358/501; 358/523; 358/504
[58] Field of Search ................................ 395/109, 131; 358/523, 406, 517, 518, 504, 520

[56] References Cited

U.S. PATENT DOCUMENTS

| | | | |
|---|---|---|---|
| 4,282,510 | 8/1981 | Southgate | 348/125 |
| 4,334,240 | 6/1982 | Franklin | 358/525 |
| 4,347,580 | 8/1982 | Bond | 364/824 |
| 4,350,996 | 9/1982 | Rosenfeld | 358/536 |
| 4,456,924 | 6/1984 | Rosenfeld | 358/536 |
| 4,472,786 | 9/1984 | Larson | 364/824 |
| 4,477,833 | 10/1984 | Clark | 358/525 |

(List continued on next page.)

FOREIGN PATENT DOCUMENTS

| | | |
|---|---|---|
| 0144188 | 1/1984 | European Pat. Off. . |
| 0264281 | 4/1988 | European Pat. Off. . |
| 2213674 | 8/1989 | United Kingdom . |

OTHER PUBLICATIONS

R. K. Molla, "Electronic Color Separation", R. K. Printing & Publishing, New York, 1988.
G. Wyszecki et al, "Color Science", Wiley & Sons, 1982.
Stone et al, "Color Gamut Mapping and the Printing of Digital Color Images", ACM Trans. on Graphics, 7(4), Oct. 1988, pp. 249–292.
J. Stoer, "Introduction to Numerical Analysis", Springer–Verlag, New York, 1980.
De Boor, "A Practical Guide to Splines", Applied Math. Sciences, vol. 27, Springer–Verlag, New York, 1978.
Bartels et al, "An Introduction to Splines . . . ", Morgan Kaufmann Publishers Inc., Los Altos, Calif., 1987.
Marquet, "Dehalftoning of Negatives . . . ", Optica Acta 6, pp. 404–405.
Marquet et al, "Interpretation of Particular Aspects of . . . ", Optica Acta 8, 1961, pp. 267–277.
Kermisch et al, "Fourier Spectra of Halftone Images", J. Opt. Soc. Amer., 65, 1975, pp. 716–723.
Wyszecki et al, "Color Science: concepts and Methods, Quantitative Data and Formulae", Second Edition, John Wiley & Sons, 1982, New York.
J. A. C. Yule, "Principles of Color Reproduction", John Wiley & Sons, 1967, New York.
F. W. Billmeyer et al, "Principles of Color Technology", Second Ed., John Wiley & Sons, 1981, New York.
Engeldrum, "Almost color Mixture Functions", J. of Imaging Tehnology, 14 (4), Aug., 1988.
R. Holub et al, "Color Systems Calibration for Graphic Arts", (I & II), Jou. of Imaging Tech., vol. 14, No. 2, Apr. 1988, pp. 47–60.
J. D. Foley et al, "Fundamentals of Interactive Computer Graphics", Addison–Wesley Publishing Co., Massachusetts, 1982.

(List continued on next page.)

*Primary Examiner*—Raymond J. Bayerl
*Assistant Examiner*—Tracy M. Legree
*Attorney, Agent, or Firm*—Weingarten, Schurgin, Gagnebin & Hayes

[57] ABSTRACT

A system fop matching a first picture on a monitor to a second picture printed on a printing medium. The system includes a) a monitor for receiving a first image and for displaying the first image as the first picture, b) printing apparatus for receiving a second image and for producing the second picture and c) conversion apparatus for converting first colors of the first image, defined in a first color coordinate system of the monitor, to second colors of the second image, defined in a second color coordinate system of the printing apparatus and the printing medium, through third colors defined in a colorimetric color coordinate system, to convert from the first image to the second image.

9 Claims, 4 Drawing Sheets

U.S. PATENT DOCUMENTS

| | | | |
|---|---|---|---|
| 4,481,532 | 11/1984 | Clark | 358/504 |
| 4,500,919 | 2/1985 | Schreiber | 358/518 |
| 4,511,989 | 4/1985 | Sakamoto | 358/525 |
| 4,639,770 | 1/1987 | Jung et al. | 358/525 |
| 4,670,780 | 6/1987 | McManus et al. | 358/518 |
| 4,712,141 | 12/1987 | Tomohisa | 358/525 |
| 4,717,954 | 1/1988 | Fujita | 358/523 |
| 4,752,822 | 6/1988 | Kawamura | 358/523 |
| 4,794,460 | 12/1988 | Shiota | 358/350 |
| 4,819,193 | 4/1989 | Imao | 358/521 |
| 4,825,386 | 4/1989 | Bogacki | 395/116 |
| 4,833,531 | 5/1989 | Yoshinori et al. | 358/523 |
| 4,837,722 | 6/1989 | Sara | 364/723 |
| 4,959,790 | 9/1990 | Morgan | 395/109 |
| 5,313,291 | 5/1994 | Appel et al. | 358/501 |
| 5,315,380 | 5/1994 | Ingraham et al. | 358/500 |
| 5,333,069 | 7/1994 | Spence | 358/517 |
| 5,339,176 | 8/1994 | Smilansky et al. | 358/504 |
| 5,369,499 | 11/1994 | Yip | 358/406 |

OTHER PUBLICATIONS

Baxes, "Digital Image Processing", Prentice–Hall, Englewood Cliffs, N.J., 1984, pp. 2, 48, 50, 144, 149–150, 160.

Hwang et al, "Computer Architecture and Parallel Processing", McGraw Hill, 1984.

Johnson, "The Application of Printing Specification . . . ", TAGA Proc., 1988, p. 502.

Gonzalez et al, "Digital Image Processing", Addison–Wesley, 1987.

Society of Motion Picture and Television Engineers, "SMPTE Standard for Television . . . ", SMPTE 240M, 1988.

Park et al, "Image Reconstruction by Parametic Cubic Conversion", Computere Vision, Graphics & Image Processing 23, 1983, pp. 258–272.

A. W. Paeath, "Algorithms for fast Color Correction", Proc. of the SID, vol. 30/3, 1989.

Lamming et al, "Vidio to Print—an Empirical Approach", Proc. of the SID, vol. 30/3, 1989.

J. J. Sara. "The Automated Reproduction of pictures . . . ", thesis at MIT, Mass., USA, Aug., 1984.

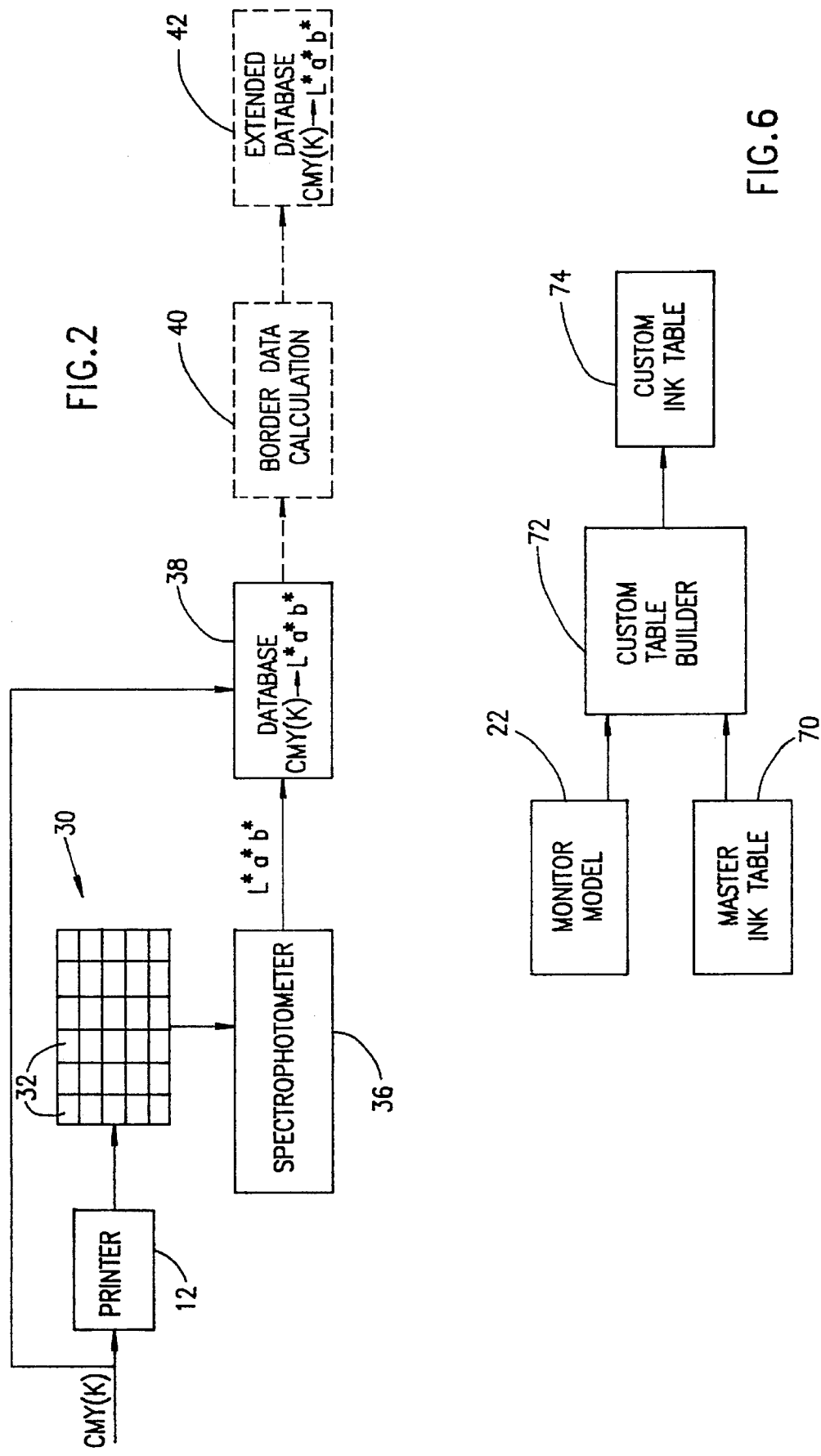

SYSTEM FOR MATCHING A PICTURE ON A MONITOR TO A PRINTED PICTURE

FIELD OF THE INVENTION

The present invention relates to systems for color conversion generally.

BACKGROUND OF THE INVENTION

Computerized systems for operating on color images are known in the art. Some of these systems scan color films or prints to produce digital color images; other systems provide tools for directly generating the digital color images. An example of such a system is the Whisper workstation manufactured by Scitex Corporation Ltd. of Herzlia, Israel.

The digital color images thus produced can be modified in any of a number of different ways, typically on a color electronic preptess system (CEPS). The CEPS enables a user to change some or all of the colors of the image, to mask out sections of the image, to clip the image, etc.

Typically, the user changes the image until it achieves an aesthetically pleasing appearance, at which point, the user saves the modified image and/or provides it to a printing device, such as a color proofer, an example of which is the 3024 proofer manufactured by Iris Graphics Inc. of Bedford, Mass., U.S.A.

The user typically modifies the image with an expectation that what he sees on the monitor of the CEPS will be reproduced exactly on the output medium of the proofer. Due to the nature of color and color reproduction, the proofer rarely can exactly reproduce the color produced on the monitor.

The above problem occurs because a number of color coordinate systems are utilized in the process of preparing and reproducing a color image. Specifically, the digital color images are typically represented in a first color coordinate system of the scanner or image generation system, typically based on a Red-Green-Blue (RGB) separation of visible light. They are displayed on the monitor of the CEPS or image generation system in a second RGB color coordinate system.

The modified image, in the first RGB color coordinate system, is provided to an output device which converts the image into an output color coordinate system, typically based on a Cyan-Magenta-Yellow-Black (CMYK) separation of printing inks. The CMYK color coordinate system of the output device is dependent on the colors of its inks and therefore, the reproductions of the same modified image on two different devices look different.

The following terms are defined:

The term "color coordinate system" refers to three or more orthogonal axes used to define a color. Example color coordinate systems are RGB, CMYK, neither of which have been defined by a standard, and which is a standard color coordinate system.

A "color space" is the three-dimensional space in which each point corresponds to a color.

A "colorimetric color coordinate system" is one that attempts to define colors as they are perceived by humans. Mathematical differences between colors in such a color space can be related to perceptual differences between colors with some consistency.

Many systems have been designed to produce color matches between a display and a printed output. U.S. Pat. No. 4,500,919 to Shreiber describes a color reproduction system that maintains the images within colorimetric color coordinate systems that are defined according to international standards. Because the color coordinate system of the digital image, the monitor and the printer are all colorimetric, the printed output should match the input image and the image as displayed on the screen.

U.S. patent application Ser. No. 749,299 assigned to the present assignee, now U.S. Pat. No. 5,315,380 describes a color conversion system for matching output of a proofer with output of a photomechanical proofing process.

U.S. patent application Ser. No. 640,468, assigned to a related company of the present assignee, describes a color conversion system for matching the output of two types of printing devices.

SUMMARY OF THE INVENTION

The present invention provides a novel method for converting between colors of a picture on a color monitor and colors of a printed picture.

There is therefore provided, in accordance with a preferred embodiment of the present invention, a system for matching a first picture on a monitor to a second picture printed on a printing medium. The system includes a) a monitor for receiving a first image and for displaying the first image as the first picture, b) printing apparatus for receiving a second image and for producing therefrom the second picture and c) conversion apparatus for converting first colors of the first image, defined in a first color coordinate system of the monitor, to second colors of the second image, defined in a second color coordinate system of the printing apparatus and the printing medium, through third colors defined in a colorimetric color coordinate system, thereby to convert from the first image to the second image.

Additionally, in accordance with a preferred embodiment of the present invention, the conversion apparatus includes a lookup table converting from the first color coordinate system to the second color coordinate system.

Moreover, in accordance with a preferred embodiment of the present invention, the colorimetric color coordinate system is the Commission International de l'Eclairage (CIE) L*a*b* (CIELAB) system.

Furthermore, in accordance with a preferred embodiment of the present invention, the lookup table is formed from a printer database comprising predetermined inkings sorted according to which colors, in the colorimetric color coordinate system, the inkings produce when printed on the printing medium. Preferably, the lookup table is also formed from a monitor model defining the relationship of the first color coordinate system and the colorimetric color coordinate system.

Still further, in accordance with a preferred embodiment of the present invention, the printer database also comprises extrapolated inkings extrapolated from the predetermined inkings. Preferably, a master ink table is calculated from the printer database.

There is also provided, in accordance with a preferred embodiment of the present invention, a method for creating a conversion table for converting from a digital color value to an ink value defining an amount of ink to be printed. The method includes the steps of a) for each of a first plurality of color patches, each having known ink values and measurable first colorimetric color values, storing the corresponding ink value and the corresponding first colorimetric color value in a first table, b) sorting the first table according to the first colorimetric color values, thereby to produce a sorted table, c) for a predetermined monitor, determining, through a monitor model, a second plurality of digital color values corresponding to a second plurality of second colorimetric color values, d) for each of the second colorimetric colors, accessing the sorted table to provide a third plurality of ink values corresponding to the second colorimetric color value and to its neighboring second colorimetric color values, and e) for each of the second plurality of digital color values, computing a computed ink value based on the third plurality ink values and storing, in the conversion table, the digital color value and the computed ink value.

There is further provided, in accordance with a preferred embodiment of the present invention, a method for creating a conversion table for converting from a digital color value to an ink value defining an amount of ink to be printed. The further method including the steps of a) on a predetermined printing device, printing a first plurality of color patches having known ink values, b) measuring first colorimetric color values of each of the color patches, c) for each color patch, storing the corresponding ink value and the corresponding first colorimetric color value in a first table, d) sorting the first table according to the first colorimetric color values, thereby to produce a sorted table, e) for a predetermined monitor, selecting a second plurality of digital color values and determining, through a monitor model, second colorimetric color values corresponding to each of the sample colors, f) for each of the second colorimetric colors, accessing the sorted table to provide a plurality of ink values corresponding to the second colorimetric color and to its neighboring second colorimetric colors, and g) for each second plurality of digital color values, computing a computed ink value based on the plurality ink values and storing, in the conversion table, the monitor color and the computed ink value.

Additionally, in accordance with a preferred embodiment of the present invention, the step of sorting includes the steps of sorting the first table to produce an unevenly sorted table, defining a grid spacing for the sorted table and interpolating ink values of neighboring elements of the unevenly sorted table to provide datavalues for the sorted table.

Moreover, in accordance with a preferred embodiment of the present invention, the monitor model is a function of phosphor values of the monitor.

Further, in accordance with a preferred embodiment of the present invention, the further method includes the step of interpolating edge values of the first table thereby to provide an extended first table.

Finally, in accordance with a preferred embodiment of the present invention, the step of computing includes the step of performing a weighted average of the ink values weighted by a color distance of each neighboring colorimetric color value from the second colorimetric color value.

BRIEF DESCRIPTION OF THE DRAWINGS

The present invention will be understood and appreciated from the following detailed description, taken in conjunction with the drawings in which:

FIG. 2 is a block diagram illustration of apparatus for providing a printer database and an extended printer database, useful in creating the apparatus of FIG. 1;

FIG. 6 is a block diagram illustration of a method for creating a custom ink table from a master ink table created from the sorted printer database provided in FIG. 4 and a monitor description, useful in the apparatus of FIG. 1.

DETAILED DESCRIPTION OF A PREFERRED EMBODIMENT

Figure 1:
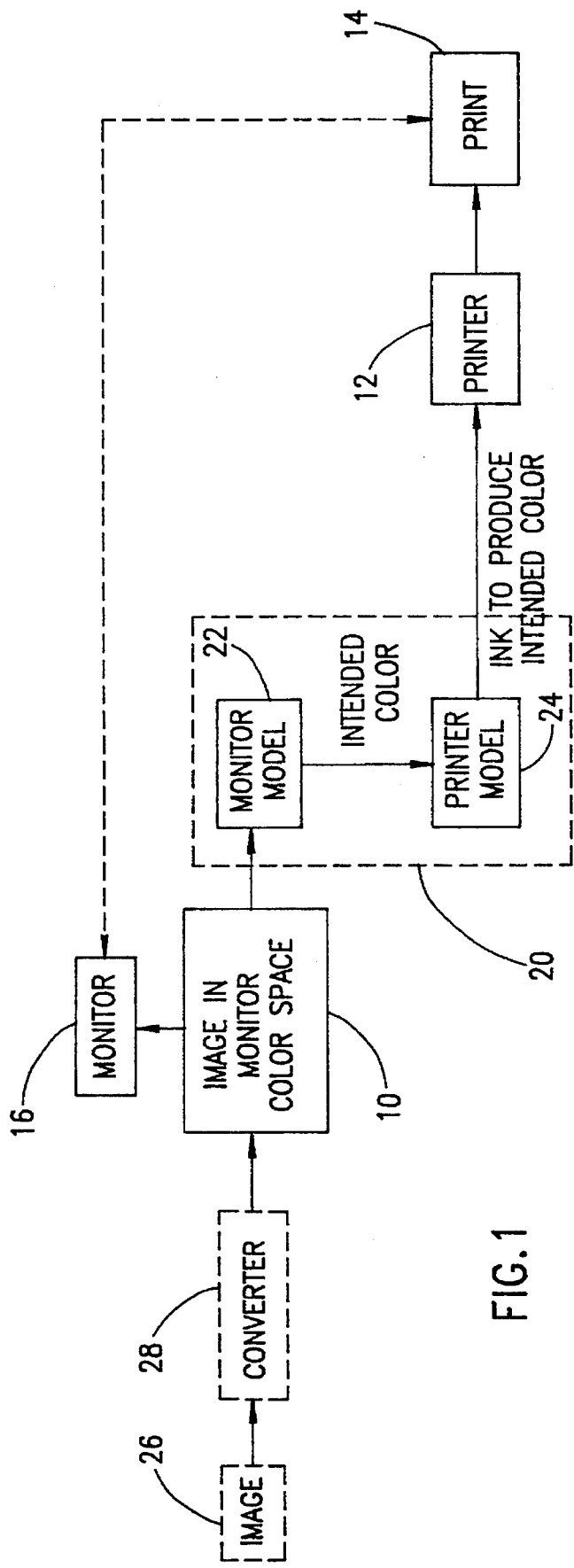
FIG. 1 is a block diagram illustration of apparatus for matching colors of a picture on a color monitor to colors of a printed picture, constructed and operative in accordance with a preferred embodiment of the present invention.

Reference is now made to FIG. 1 which illustrates a system for reproducing an image 10 with a printing device 12, such as the Iris 4012, manufactured by Iris Graphics Inc. of Bedford, Mass., thereby to produce an output print which is generally a colorimetric match to a representation of image 10 on a monitor 16. The colorimetric match of the representation on monitor 16 with the print 14 is indicated by the dashed line.

The system typically comprises an ink selector 20 for selecting printing inks to generally colorimetrically reproduce the representation of image 10 in the output print 14. The ink selector 20 typically comprises a monitor model 22 for determining for each pixel in image 10, the color on the monitor 16 as described in a colorimetric color coordinate system and a printer model 24 for determining, for each color on the monitor 16, the inks which the printer 12 needs to reproduce the color on the print 14. As described hereinbelow, the ink selector 20 is typically implemented as a lookup table (LUT).

Image 10 is typically provided from the user in a first coordinate system, such as any suitable RGB coordinate system. Typically, the intensity of each pixel of the image 10 is represented as a three element vector.

If the first color coordinate system is not similar to the color coordinate system of the monitor 16, the image displayed on monitor 16 will not look similar to the picture that the user originally scanned or created. Therefore, the system of the present invention optionally can receive an image 26 from the user and can provide it to an optional converter 28 for converting the image 26 into image 10 in the color coordinate system of the monitor 16.

The converter 28 typically comprises a 3×3 matrix for converting from the RGB space of the image 26 to the RGB space of the monitor 16 and a matrix operator for multiplying each three element intensity vector by the matrix. Converter 28 can be created according to any of the variety of methods known in the art. The creation of converter 28 depends upon knowing the RGB space of the input image 26; The better this input space is understood, the more accurate the color conversion can be.

The monitor model 22 is described in an article by Peter G. Engeldrum and John L. Ingraham, "Analysis of White Point and Phosphor Set Differences of CRT Displays", *COLOR Research and Application*, Vol. 15, No. 3, June 1990, which article is incorporated herein by reference.

As described in the article, the colorimetric value of a color on the monitor 16 can be calculated from the phosphor specifications of the monitor 16 as published by the monitor manufacturer. Each phosphor has specified chromaticity coordinates, $x_i$, $y_i$, $z_i$, i=R, G or B, and the tristimulus values of any display color are defined from the chromaticity coordinates and the amount of the phosphor primaries (R,G,B) driving the monitor 16 as follows:

$$X = C_R x_R R + C_G x_G G + C_B x_B B$$
$$Y = C_R y_R R + C_G y_G G + C_B y_B B \qquad (1)$$
$$Z = C_R z_R R + C_G z_G G + C_B z_B B$$

When white is displayed on the monitor 16, the phosphor primary values (R,G,B) are usually of unit value and the tristimulus values (X,Y,Z) have known values (XI,YI,ZI). Solving equation 1 with the abovedefined condition, provides the values of the $C_i$'s.

The tristimulus values (X,Y,Z) of any displayed color can be transformed to any colorimetric color coordinate system, such as the CIELAB color coordinate system. For the CIELAB color coordinate system, the relationship is:

$$L^* = 116(Y/YI)^{1/3} - 16 \qquad (2a)$$
$$a^* = 500[(X/XI)^{1/3} - (Y/YI)^{1/3}] \qquad (2b)$$
$$b^* = 200[(Y/YI)^{1/3} - (Z/ZI)^{1/3}] \qquad (2c)$$

Equations 1 and 2 form the monitor model 22.

Reference is now made to FIGS. 2–6 which illustrate the method by which the printer model 24 is created.

FIG. 2 illustrates a method by which the color space of printing device 12 is defined. The printing device 12 receives a plurality of stepped ink values, such as CMY values, thereby to produce a collection 30 of color patches 32. As is known in the art, the ink values typically have the intensity values of grid points 33 (FIG. 3A) on a three-dimensional grid 34 and there is one ink value for each grid point 33.

The ink values may also be CMYK values, covering the entire gamut of the printing device 12, in which case the grid is a four-dimensional grid. The remainder of the present invention will be described with respect to CMY values, it being understood that the invention can easily be generalized to operating with CMYK values.

In accordance with a preferred embodiment of the present invention, a spectrophotometer 36, such as the Gretag SPM-100, manufactured by Gretag, Althardstrasse 70, CH-8105 Regensdorf, Zurich, Switzerland, is utilized to measure the color value, in the selected colorimetric color coordinate system, of each color patch 32.

Each ink value and its corresponding measured colorimetric color value are then stored in a database 38. If desired, the database 38 can be extended by interpolating the data at the edges of grid 34. The extrapolation, performed by a border data calculation unit 40, can be of any suitable extrapolation method.

Figure 3A:
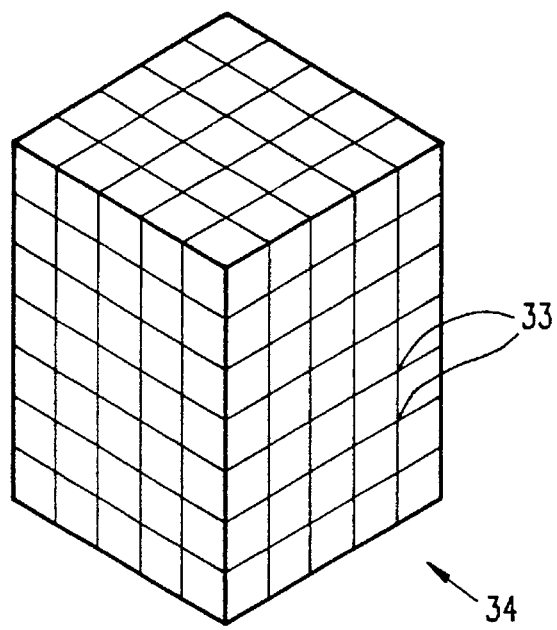
FIG. 3A is a pictorial illustration of a representation of the printer database provided in FIG. 2 as a cube.
Figure 3B:
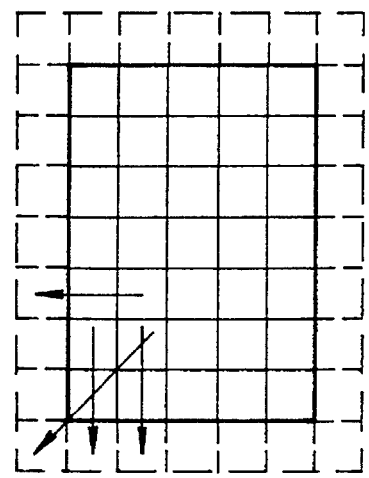
FIG. 3B is a two-dimensional pictorial illustration of extrapolated from a plane of the cube of FIG. 3A, thereby to provide the extended database of FIG. 2.

In accordance with one embodiment of the present invention and as shown with arrows in FIG. 3B, the extrapolation is performed on data from the typically two closest grid planes to the edges of the grid. In other words, the datapoint for an extrapolated row point (i,j) is extrapolated from data in the same column j in the two previous rows, for an extrapolated column point (m,n), the data is taken from the data in the same row m in the previous two columns n and for an extrapolated corner point (x,y) from the previous two corner points (x−1,y−1), (x−2,y−2).

The resultant extended database 42 or, if the extended database 42 was not created, the database 38, is provided to a sorter 50 (FIG. 4) for creating a colorimetric database 52 which is a reorganization of the database 38 or 42 in accordance with the colorimetric color values of each datapoint. It will be appreciated that databases 38 and 42 are organized according to the ink values.

After some modifications, detailed hereinbelow, to the colorimetric database 52, the colorimetric database 52 can provide the ink values for producing a colorimetric color provided to it by the monitor model 22, where the colorimetric color matches the color on the monitor 16. Thus, the printed ink values produce a color which matches the color displayed on the monitor 16.

Figure 4:
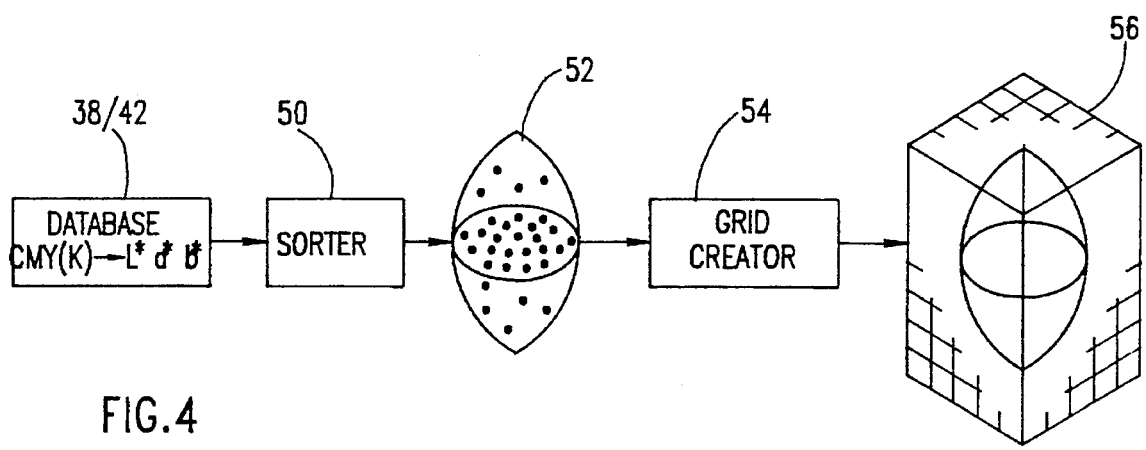
FIG. 4 is a part block diagram, part pictorial illustration of apparatus for sorting the printer databases provided in FIG. 2.

As shown in FIG. 4, the colorimetric database 52 has a shape similar to the color space of the selected colorimetric color coordinate system. For the CIELAB coordinate system, the color space has the three-dimensional shape of two cones attached to each other at the base, as shown.

Because, as shown in FIG. 4, the data in colorimetric database 52 typically is not uniformly spread throughout the database 52, a three-dimensional grid 56 is created, via a grid creator 54, which contains the color space, according to the L*a*b* value of each inking.

The grid creator 54 defines the grid 56 and then, for each grid point of the grid 56, determines the corresponding ink values according to the method described hereinbelow.

For grid points corresponding to neutral colors, such as white, black and the entirety of shades of grey, the grid creator 54 searches database 52 for the closest datapoint in each of eight directions, within a given range. It will be appreciated that grid creator 54 does not search for the eight closest datapoints but rather, for the closest datapoints in each of eight directions, assuming a datapoint exists within the allowed range.

The eight directions are the combinations of greater and lesser luminance (L*) values, greater and lesser a* values and greater and lesser b* values. Thus, if the desired color is (Ld, ad, bd) the directions are:

L>Ld, a>ad, b>bd
L>Ld, a>ad, b<bd
L>Ld, a<ad, b>bd
L>Ld, a<ad, b<bd
L<Ld, a>ad, b>bd
L<Ld, a>ad, b<bd
L<Ld, a<ad, b>bd
L<Ld, a<ad, b<bd

Figure 5:
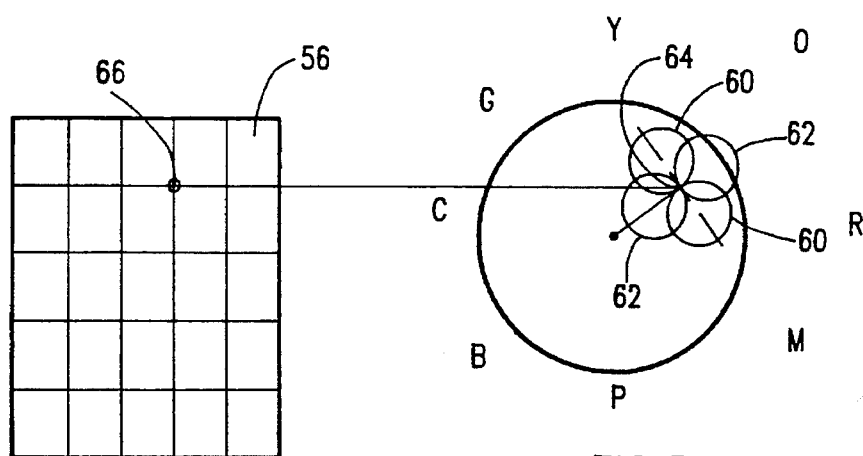
FIG. 5 is a pictorial illustration of an alternative method of calculating elements of a master ink table from elements of a sorted printer database.

For grid points corresponding to non-neutral colors (i.e. colors with a particular hue), the grid creator 54 searches database 52 for the closest datapoint in each of eight directions. As shown in FIG. 5 to which reference is now briefly made, the grid point is labeled 66 and its corresponding point in database 52 is labeled 64. The directions are combinations of greater and lesser luminance (L*) values, greater and lesser hues and greater or lesser chroms, wherein:

$$\text{hue} = \arctan(b^*/a^*) \qquad (3)$$
$$\text{chroma} = \sqrt{(a^* \times a^* + b^* \times b^*)} \qquad (4)$$

The circle in FIG. 5 is a color wheel in the CIELAB color coordinate system where the locations of the colors Yellow, Orange, Red, Magenta, Purple, Blue, Cyan and Green are indicated. The small circles 60 define the area of the color space in which the creator 54 searches for datapoints with similar chroma values. The small circles 62 define the area of the color space in which the creator 54 searches for datapoints with similar hue values. The searching areas for L* values are above and below the plane of FIG. 5.

For all grid points, the ink values of the datapoints which are found, where a maximum of eight datapoints are possible for each grid point, are combined via a weighted averaging, where the weighting for a given datapoint is its distance from the point 64. The colorimetric grid point (L*a*b*) and the resultant ink value (CMY(K)) are placed into a master ink table 70 (FIG. 6).

The monitor model 22, which converts the pixel intensity values of the image 10 to colorimetric color values, and the master ink table 70, which converts colorimetric color values to ink values, are provided to a custom table builder 72 which combines the two together into a single custom ink table 74 for the selected printing device 12 and the selected monitor 16.

The custom ink table 74 comprises a plurality of output ink values corresponding to a plurality of input RGB coordinates. Custom table builder 72 generates the input RGB coordinates on a user-selected grid and calculates the following for each input RGB coordinate:

1. Using monitor model 22, the colorimetric coordinates (L*,a*,b*) are calculated from the given (R, G, B);

2. The (L*,a*,b*) coordinates are input into master ink table 70 and the ink value associated therewith is produced. If the (L*,a*,b*) coordinates do not exist in the master ink table 70, the output is interpolated from the nearest values in the table 70 in accordance with standard interpolation techniques; and 3. The ink value produced in step 2 is associated with the given (R,G,B) coordinates in the custom ink table 74.

It will be appreciated that the custom ink table 74 and the master ink table 70 are both lookup tables. The custom ink table 74 typically is designed to include extra entries which are outside the gamut of the printer 12. These extra entries are utilized, as described hereinbelow, for interpolation purposes only.

Figure 7:
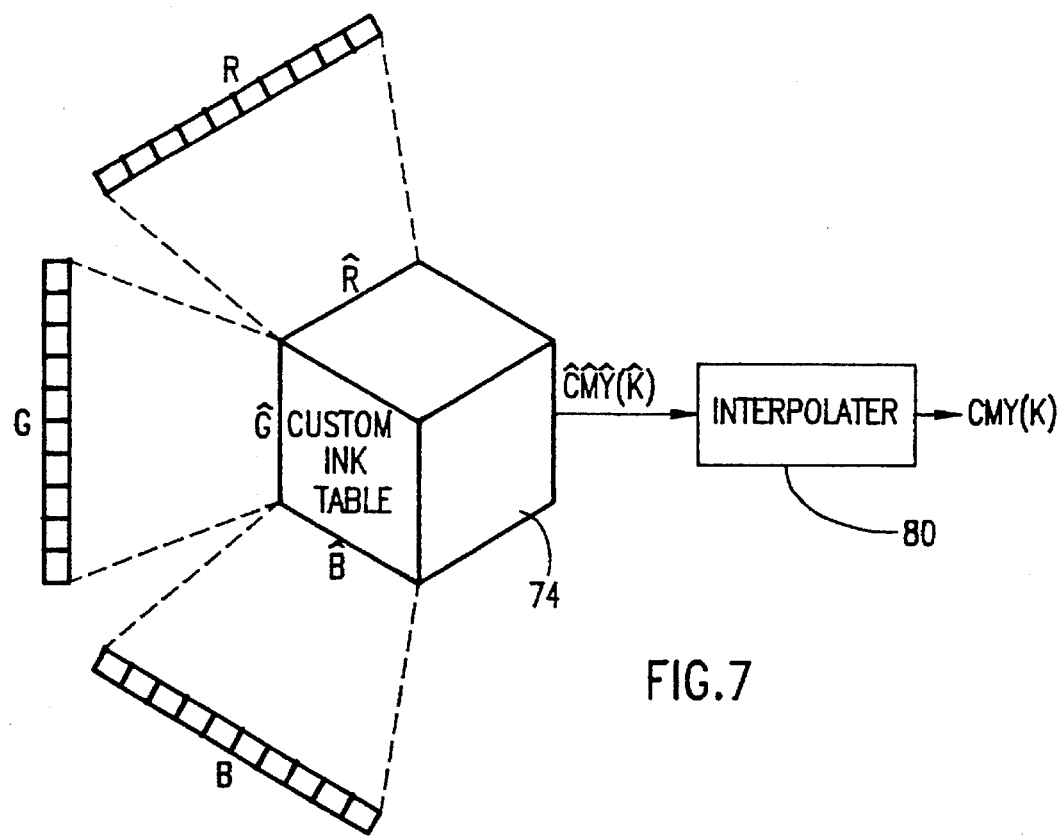
FIG. 7 is a pictorial illustration of a method of accessing the custom ink table created in FIG. 7.

Typically, the custom ink table 74 does not have a datapoint for every possible color producible on the monitor 16. Therefore, as shown in FIG. 7 to which reference is now made, when accessing the custom ink table 74, the R, G and B coordinates are first quantized to determine coordinates of a cell in custom ink table 74 roughly corresponding to the desired color (R,G,B). The cell has coordinates $(\hat{R}_i, \hat{G}_i, \hat{B}_i)$ where, for the present application, $\hat{A}$ is the notation for the quantized version A of A.

The cell coordinates $(\hat{R}_i, \hat{G}_i, \hat{B}_i)$ and the coordinates of its neighboring cells in all directions $(\hat{R}_i, \hat{G}_{i+1}, \hat{B}_i)$, $(\hat{R}_{i+1}, \hat{G}_i, \hat{B}_i)$, $(\hat{R}_{i+1}, \hat{G}_{i+1}, \hat{B}_i)$, $(\hat{R}_i, \hat{G}_i, \hat{B}_{i+1})$, $(\hat{R}_i, \hat{G}_{i+1}, \hat{B}_{i+1})$, $(\hat{R}_{i+1}, \hat{G}_i, \hat{B}_{i+1})$, $(\hat{R}_{i+1}, \hat{G}_{i+1}, \hat{B}_{i+1})$ are provided as input values to the custom ink table 74 which provides, as output, a plurality of ink values $(\hat{C}_1, \hat{M}_1, \hat{Y}_1)$, $(\hat{C}_2, \hat{M}_2, \hat{Y}_2)$, $(\hat{C}_3, \hat{M}_3, \hat{Y}_3)$, $(\hat{C}_4, \hat{M}_4, \hat{Y}_4)$, $(\hat{C}_5, \hat{M}_5, \hat{Y}_5)$, $(\hat{C}_6, \hat{M}_6, \hat{Y}_6)$, $(\hat{C}_7, \hat{M}_7, \hat{Y}_7)$, $(\hat{C}_8, \hat{M}_8, \hat{Y}_8)$ corresponding to each of the input cell coordinates. If the present invention is implemented with CMYK values, the output of custom ink table 74 is $\hat{C}\hat{M}\hat{Y}\hat{K}$ values.

An interpolator 80 receives the plurality of ink values and interpolates them, as described hereinbelow, to provide the output ink value (C,M,Y) corresponding with the input (R,G,B) value.

The interpolator 80 computes the following equations:

$$C = \begin{cases} (1-K_R)(1-K_G)(1-K_B)\hat{C}_1 + \\ (1-K_R)(K_G)(1-K_B)\hat{C}_2 + \\ (K_R)(1-K_G)(1-K_B)\hat{C}_3 + \\ (K_R)(K_G)(1-K_B)\hat{C}_4 + \\ (1-K_R)(1-K_G)(K_B)\hat{C}_5 + \\ (1-K_R)(K_G)(K_B)\hat{C}_6 + \\ (K_R)(1-K_G)(K_B)\hat{C}_7 + \\ (K_R)(K_G)(K_B)\hat{C}_8 \end{cases} \quad (3a)$$

$$M = \begin{cases} (1-K_R)(1-K_G)(1-K_B)\hat{M}_1 + \\ (1-K_R)(K_G)(1-K_B)\hat{M}_2 + \\ (K_R)(1-K_G)(1-K_B)\hat{M}_3 + \\ (K_R)(K_G)(1-K_B)\hat{M}_4 + \\ (1-K_R)(1-K_G)(K_B)\hat{M}_5 + \\ (1-K_R)(K_G)(K_B)\hat{M}_6 + \\ (K_R)(1-K_G)(K_B)\hat{M}_7 + \\ (K_R)(K_G)(K_B)\hat{M}_8 \end{cases} \quad (3b)$$

$$Y = \begin{cases} (1-K_R)(1-K_G)(1-K_B)\hat{Y}_1 + \\ (1-K_R)(K_G)(1-K_B)\hat{Y}_2 + \\ (K_R)(1-K_G)(1-K_B)\hat{Y}_3 + \\ (K_R)(K_G)(1-K_B)\hat{Y}_4 + \\ (1-K_R)(1-K_G)(K_B)\hat{Y}_5 + \\ (1-K_R)(K_G)(K_B)\hat{Y}_6 + \\ (K_R)(1-K_G)(K_B)\hat{Y}_7 + \\ (K_R)(K_G)(K_B)\hat{Y}_8 \end{cases} \quad (3c)$$

where the $K_R$, $K_G$ and $K_B$ are coefficients indicating the extent of quantization of each of the R, G and B coordinates or alternatively, the distance of the datapoint from the gridpoints of master ink table 70. As is known in the art, similar relationship for the black values can be utilized if the CMYK values are utilized.

The table is sized to include additional entries, so that there are always a full set of inkings available for interpolation. They are computed like the other inkings, but they are located outside of the input color space.(In these examples that would be the color space of the monitor). Since the additional entries exceed the gamut of the input color space, they will never be used directly, and are reserved for interpolation with colors that are at or near the gamut of the input color space.

It will be appreciated that the custom ink table 74 and the interpolator 80 together form the ink selector 20.

It will be appreciated by persons skilled in the art that the present invention is not limited to what has been particularly shown and described hereinabove. Rather, the scope of the present invention is defined only by the claims that follow:

I claim:

1. A system for matching a first picture on a monitor to a second picture printed on a printing medium, the system comprising:

a monitor for receiving a first image and for displaying said first image as said first picture;

printing means for receiving a second image and for producing therefrom said second picture; and conversion means for converting first colors of said first image, defined in a first color coordinate system of said monitor, to second colors of said second image, defined in a second color coordinate system of said printing means and said printing medium, through third colors defined in a colorimetric color coordinate system, thereby to convert from said first image to said second image, and wherein said conversion means includes a lookup table converting from said first color coordinate system to said second color coordinate system, and said lookup table is formed from a printer database comprising predetermined inkings sorted according to which colors, in said colorimetric color coordinate system, said inkings produce when printed on said printing medium.

2. A system according to claim 1 and wherein said colorimetric color coordinate system is the Commission International de l'Eclairage (CIE) L*a*b* (CIELAB) system.

3. A system according to claim 1 and wherein said lookup table is also formed from a monitor model defining the relationship of said first color coorindate system and said colorimetric color coordinate system.

4. A system according to claim 1 wherein said printer database also comprises extrapolated inkings extrapolated from said predetermined inkings.

5. A system according to claim 1 and wherein a master ink table is calculated from said printer database.

6. A method for creating a conversion table for converting from a digital color value to an ink value defining an amount of ink to be printed, the method comprising the steps of:

on a predetermined printing device, printing a first plurality of color patches having known ink values;

measuring the first colorimetric color values of each of said color patches;

for each color patch, storing said corresponding ink value and said corresponding first colorimetric color value in a first table;

sorting said first table according to said first colorimetric color values, thereby to produce a sorted table;

for a predetermined monitor, selecting a second plurality of digital color values and determining, through a monitor model, second colorimetric color values corresponding to each of said sample colors;

for each of said second colorimetric colors, assessing said sorted table to provide a plurality of ink values corresponding to said second colorimetric color and to its neighboring second colorimetric colors; and for each second plurality of digital color values, computing a computed ink value based on said plurality ink values and storing, in said conversion table, said monitor color and said computed ink value, and wherein said step of storing includes the steps of sorting said first table to produce an unevenly sorted table, defining a grid spacing for said sorted table and interpolating ink values of neighboring elements of said unevenly sorted table to provide datavalues for said sorted tables.

7. A method according to claim 6 and wherein said monitor model is a function of phosphor values of said monitor.

8. A method for creating a conversion table for converting from a digital color value to an ink value defining an amount of ink to be printed, the method comprising the steps of:

on a predetermined printing device, printing a first plurality of color patches having known ink values;

measuring the first colorimetric color values of each of said color patches;

for each color patch, storing said corresponding ink value and said corresponding first colorimetric color value in a first table;

sorting said first table according to said first colorimetric color values, thereby to produce a sorted table;

for a predetermined monitor, selecting a second plurality of digital color values and determining, through a monitor model, second colorimetric color values corresponding to each of said sample colors;

for each of said second colorimetric colors, assessing said sorted table to provide a plurality of ink values corresponding to said second colorimetric color and to its neighboring second colorimetric colors;

for each second plurality of digital color values, computing a computed ink value based on said plurality ink values and storing, in said conversion table, said monitor color and said computed ink value; and interpolating edge values of said first table thereby to provide and extended first table.

9. A method for creating a conversion table for converting from a digital color value to an ink value defining an amount of ink to be printed, the method comprising the steps of:

on a predetermined printing device, printing a first plurality of color patches having known ink values;

measuring the first colorimetric color values of each of said color patches;

for each color patch, storing said corresponding ink value and said corresponding first colorimetric color value in a first table;

sorting said first table according to said first colorimetric color values, thereby to produce a sorted table;

for a predetermined monitor, selecting a second plurality of digital color values and determining, through a monitor model, second colorimetric color values corresponding to each of said sample colors;

for each of said second colorimetric colors, assessing said sorted table to provide a plurality of ink values corresponding to said second colorimetric color and to its neighboring second colorimetric colors; and for each second plurality of digital color values, computing a computed ink value based on said plurality ink values and storing, in said conversion table, said monitor color and said computed ink value, and wherein said step of storing includes the steps of performing a weighted average of said ink values weighted by a color distance of each neighboring colorimetric color value from said second colorimetric color value.

* * * * *

UNITED STATES PATENT AND TRADEMARK OFFICE
CERTIFICATE OF CORRECTION

PATENT NO. : 5,481,655
DATED : January 2, 1996
INVENTOR(S) : Michael Jacobs

It is certified that error appears in the above-indentified patent and that said Letters Patent is hereby corrected as shown below:

In the Abstract, line 1, "fop" should read --for--.

Column 1, line 18, "preptess" should read --prepress--.

Column 6, line 56, "chroms," should read --chroma,--.

Column 7, line 52, "version A of A" should read --version of A--.

Column 7, line 55, "$(\hat{R}_{i+1},\hat{B}_{i+1})$," should read --$(\hat{R}_{i+1},\hat{G}_i,\hat{B}_{i+1})$,--

Column 9, line 20, "coorindate" should read --coordinate--.

Column 10, line 7, "measuring the first" should read --measuring first--.

Column 10, line 28, "provide and extended" should read --provide an extended--.

Column 10, line 35, "measuring the first" should read --measuring first--.

UNITED STATES PATENT AND TRADEMARK OFFICE
CERTIFICATE OF CORRECTION

PATENT NO. : 5,481,655
DATED : January 2, 1996
INVENTOR(S) : Michael Jacobs

It is certified that error appears in the above-indentified patent and that said Letters Patent is hereby corrected as shown below:

Column 10, line 46, "assessing" should read --accessing--.

Column 10, line 55, "said step of storing" should read --said step of computing--.

Signed and Sealed this

First Day of October, 1996

Attest:

BRUCE LEHMAN

*Attesting Officer*    *Commissioner of Patents and Trademarks*